US008330989B2

(12) United States Patent
Kusunoki

(10) Patent No.: US 8,330,989 B2
(45) Date of Patent: Dec. 11, 2012

(54) PRINT CONTROL DEVICE FOR OBTAINING APPROPRIATE PRINT RESULTS

(75) Inventor: Hideyuki Kusunoki, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 431 days.

(21) Appl. No.: 12/632,287

(22) Filed: Dec. 7, 2009

(65) Prior Publication Data
US 2010/0165386 A1 Jul. 1, 2010

(30) Foreign Application Priority Data

Dec. 25, 2008 (JP) ................................. 2008-330247

(51) Int. Cl.
*G06K 15/02* (2006.01)
(52) U.S. Cl. ........ 358/1.2; 358/1.18; 358/452; 358/537; 715/274
(58) Field of Classification Search ................. 358/1.13, 358/1.15, 527; 399/81
See application file for complete search history.

(56) References Cited

U.S. PATENT DOCUMENTS

| 6,157,439 | A * | 12/2000 | Rousseau et al. | 355/61 |
| 6,281,983 | B1 * | 8/2001 | Takahashi et al. | 358/1.2 |
| 6,285,842 | B1 * | 9/2001 | Katamoto et al. | 399/81 |
| 6,748,185 | B2 * | 6/2004 | Song | 399/81 |
| 7,317,552 | B2 * | 1/2008 | Sumiuchi | 358/1.2 |
| 2005/0171906 | A1 * | 8/2005 | Sean Shek et al. | 705/41 |
| 2006/0114529 | A1 * | 6/2006 | Oh | 358/527 |
| 2006/0215197 | A1 * | 9/2006 | Tobioka | 358/1.13 |
| 2007/0025752 | A1 * | 2/2007 | Maeda et al. | 399/81 |
| 2008/0117458 | A1 * | 5/2008 | Pyo et al. | 358/1.15 |
| 2008/0170252 | A1 * | 7/2008 | Fukui | 358/1.13 |

FOREIGN PATENT DOCUMENTS

| CN | 1782982 A | 6/2006 |
| JP | H05-100646 A | 4/1993 |
| JP | H06-022643 A | 2/1994 |
| JP | H10-171311 A | 6/1998 |
| JP | 2000-307781 A | 11/2000 |
| JP | 2003-107963 A | 4/2003 |
| JP | 2003-319144 A | 11/2003 |
| JP | 2007-306081 A | 11/2007 |

OTHER PUBLICATIONS

Japan Patent Office; Office Action in Japanese Patent Application No. 2008-330247 (counterpart to the above-captioned US Patent Application) mailed on Aug. 3, 2010.
The State Intellectual Property Office of the People's Republic of China, Notification of First Office Action for Chinese Patent Application No. 200910262668.2 (counterpart to above-captioned patent application), issued Oct. 31, 2011.

* cited by examiner

*Primary Examiner* — King Poon
*Assistant Examiner* — Ted Barnes
(74) *Attorney, Agent, or Firm* — Baker Botts L.L.P.

(57) ABSTRACT

A print control device includes a data acquiring section, a print control section, a preview-image output control section, and a print-ratio acquiring section. The data acquiring section acquires image data. The print control section controls a printing device to print an image based on the image data on a sheet. The preview-image output control section outputs preview images at a plurality of print ratios. The preview images are indicators of print results to be obtained when the printing device prints, on the sheet, the image based on the image data at the respective print ratios. The print-ratio acquiring section acquires print-ratio specifying information through an input device that can be operated by a user, after the preview-image output control section outputs the preview images. The print control section controls the printing device to print, on the sheet, the image based on the image data at a print ratio specified by the print-ratio specifying information.

13 Claims, 8 Drawing Sheets

FIG. 3

SPECIFY RANGE OF PRINT RATIO.
FROM [    ] % TO [    ] %

[SELECT PRINT RATIO]

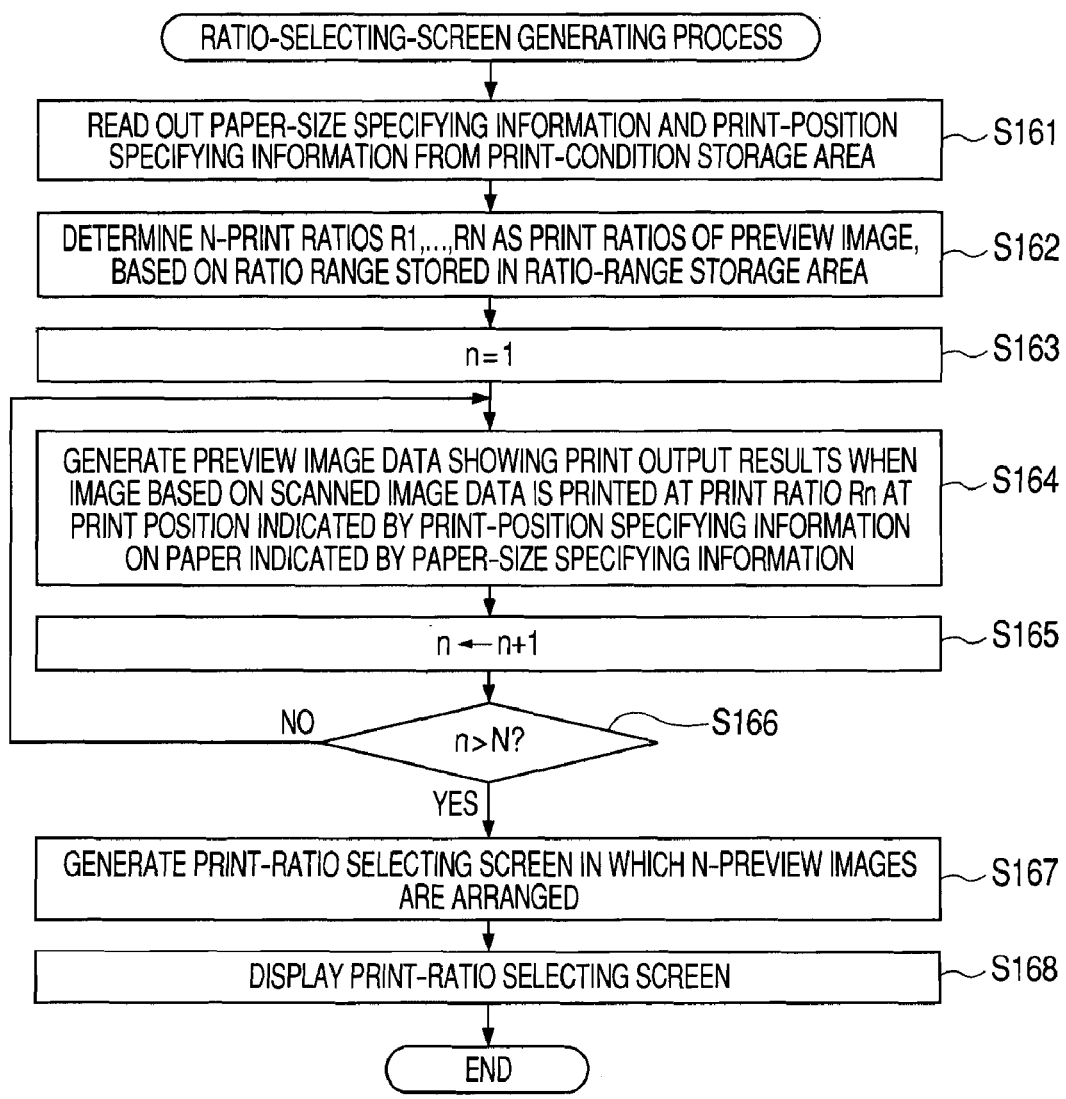

FIG. 4

( RATIO-SELECTING-SCREEN GENERATING PROCESS )

READ OUT PAPER-SIZE SPECIFYING INFORMATION AND PRINT-POSITION SPECIFYING INFORMATION FROM PRINT-CONDITION STORAGE AREA — S161

DETERMINE N-PRINT RATIOS R1,...,RN AS PRINT RATIOS OF PREVIEW IMAGE, BASED ON RATIO RANGE STORED IN RATIO-RANGE STORAGE AREA — S162 n=1 — S163

GENERATE PREVIEW IMAGE DATA SHOWING PRINT OUTPUT RESULTS WHEN IMAGE BASED ON SCANNED IMAGE DATA IS PRINTED AT PRINT RATIO Rn AT PRINT POSITION INDICATED BY PRINT-POSITION SPECIFYING INFORMATION ON PAPER INDICATED BY PAPER-SIZE SPECIFYING INFORMATION — S164 n ← n+1 — S165 n>N? — S166
NO → (loop back)
YES ↓

GENERATE PRINT-RATIO SELECTING SCREEN IN WHICH N-PREVIEW IMAGES ARE ARRANGED — S167

DISPLAY PRINT-RATIO SELECTING SCREEN — S168

( END )

PRINT CONTROL DEVICE FOR OBTAINING APPROPRIATE PRINT RESULTS

CROSS REFERENCE TO RELATED APPLICATIONS

This application claims priority from Japanese Patent Application No. 2008-330247 filed Dec. 25, 2008. The entire content of the priority application is incorporated herein by reference.

TECHNICAL FIELD

The invention relates to a print control device and a storage medium storing a set of program instructions for realizing functions of a print control device.

BACKGROUND

A conventional print control device controls a printing device to print an image based on image data to be printed acquired externally, on a sheet such as paper.

Another conventional print control device controls a printing device to print an image based on image data that indicate the scanning results of an original document scanned by a scanning device, thereby controlling the printing device to generate a copy of the original document.

Additionally, a copier containing a scanning device and a printing device therein is known. The copier is configured to change an enlargement ratio, a reduction ratio, etc. of an original document through operations of cursor keys provided on a control panel.

The reducing function of the copier is used, for example, to perform reduced printing of an image of an original document so that the image fits in a printing sheet according to a user's instruction, when the size of the original document to be scanned is larger than the size of the printing sheet. In addition, the enlarging function of the copier is used, for example, to perform enlarged printing of only a part of an original document to be scanned according to the user's instruction.

SUMMARY

With the conventional copier, however, when specifying a print ratio (enlargement ratio, reduction ratio, etc.), the user needs to specify an appropriate ratio through the control panel on the copier, while picturing what the print output results (print results) will be like. Hence, the print output results by the print ratio specified by the user are not necessarily like what the user pictured.

If the actual print output results are different from what the user originally desired, the user again specifies the print ratio to make a copy of the original document on the copier until the desired print output results are obtained. Thus, in this case, there is a problem that resources such as paper sheets are wasted. There is another problem that the above-described repetitive work worsens the work efficiency of the user.

In addition, the conventional devices have similar problems when the user specifies a print position and a paper size to control a printing device to print an image.

That is, with the conventional devices, when specifying a print position on paper, the user needs to specify an appropriate print position through the control panel on the copier, while picturing what the print output results will be like. Hence, the print output results by the print position specified by the user are not necessarily like what the user pictured. In this case, since the user repeats the print operation, there is a problem that resources such as paper sheets are wasted.

Similarly, with the conventional devices, the paper size is sometimes too large or too small. In this case, too, since the user repeats the print operation, there is a problem that resources such as paper sheets are wasted.

In view of the foregoing, it is an object of the invention to provide a print control device that allows the user to specify at least one of an appropriate print ratio, print position, and sheet size, when controlling a printing device to print an image based on image data. It is another object of the invention to provide a storage medium storing a set of program instructions for realizing functions of such a print control device.

In order to attain the above and other objects, the invention provides a print control device. The print control device includes a data acquiring section, a print control section, a preview-image output control section, and a print-ratio acquiring section. The data acquiring section acquires image data. The print control section controls a printing device to print an image based on the image data on a sheet. The preview-image output control section outputs preview images at a plurality of print ratios. The preview images are indicators of print results to be obtained when the printing device prints, on the sheet, the image based on the image data at the respective print ratios. The print-ratio acquiring section acquires print-ratio specifying information through an input device that can be operated by a user, after the preview-image output control section outputs the preview images. The print control section controls the printing device to print, on the sheet, the image based on the image data at a print ratio specified by the print-ratio specifying information.

According to another aspect, the invention also provides a print control device. The print control device includes a data acquiring section, a preview-image output control section, a specifying-information acquiring section, and a print control section. The data acquiring section acquires image data. The preview-image output control section outputs preview images in a plurality of patterns of at least any one of print ratios, print positions, and sheet sizes. The preview images are indicators of print results to be obtained when a printing device prints the image on the sheet. The specifying-information acquiring section acquires specifying information through an input device that can be operated by a user, after the preview-image output control section outputs the preview images. The specifying information specifies one of the plurality of patterns. The print control section controls the printing device to print, on a sheet, an image based on the image data, in accordance with the specifying information.

According to another aspect, the invention also provides a storage medium storing a set of program instructions executable on a computer. The set of program instructions includes: acquiring image data; outputting preview images in a plurality of patterns of at least any one of print ratios, print positions, and sheet sizes, the preview images being indicators of print results to be obtained when a printing device prints the image on the sheet; acquiring specifying information through an input device that can be operated by a user, after the preview images are outputted, the specifying information specifying one of the plurality of patterns; and controlling the printing device to print, on a sheet, an image based on the image data, in accordance with the specifying information. The storage medium includes a magnetic disk, an optical disk, and the like, for example.

BRIEF DESCRIPTION OF THE DRAWINGS

Embodiments in accordance with the invention will be described in detail with reference to the following figures wherein:

FIG. 3 is an explanatory diagram showing a ratio-range input screen;

FIG. 4 is a flowchart showing a ratio-selecting-screen generating process executed by the control section;

DETAILED DESCRIPTION

A print control device according to an embodiment of the invention will be described while referring to FIGS. 1 through 9. The print control device of the embodiment is applied to a copier.

Figure 1:
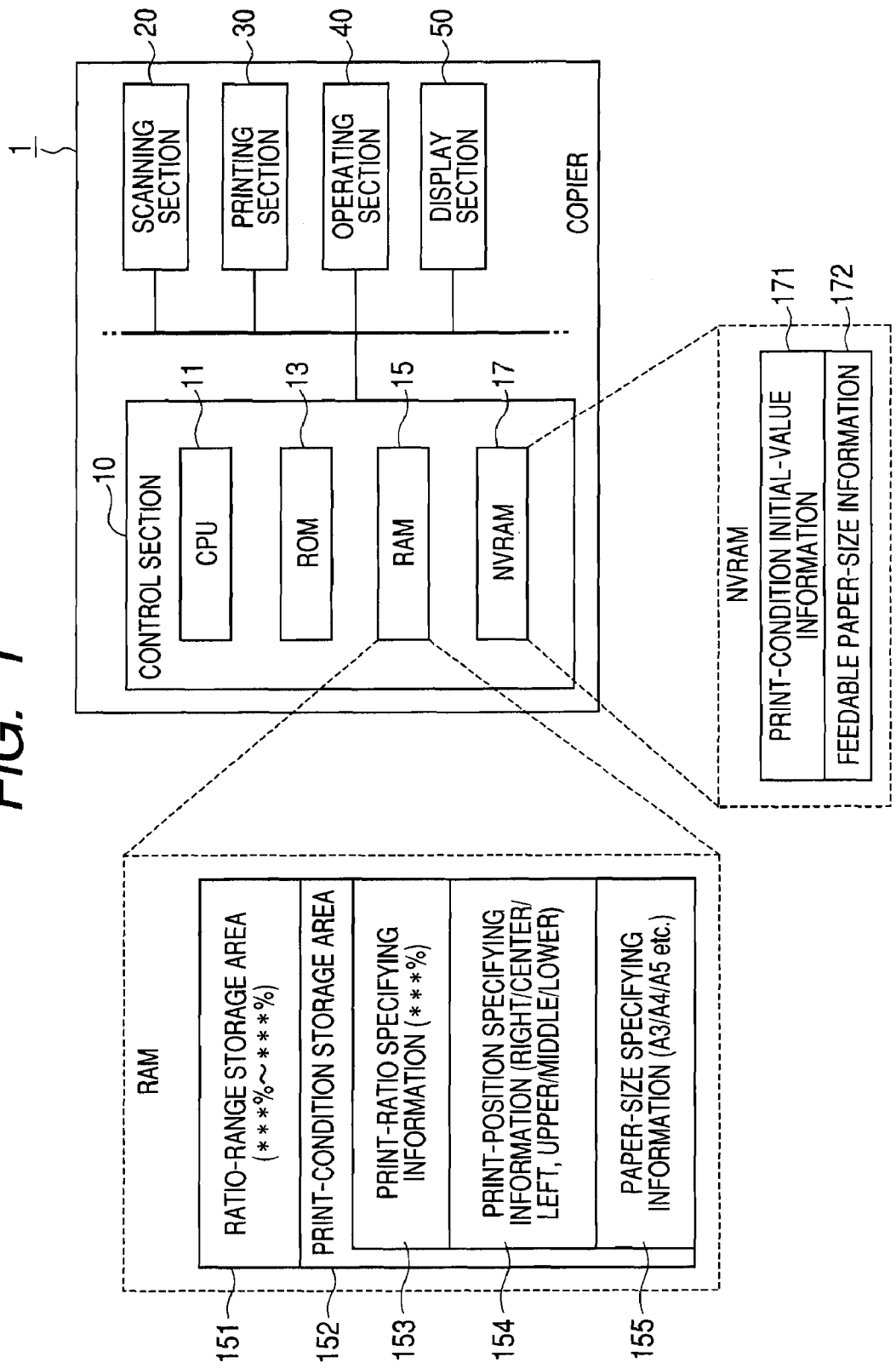
FIG. 1 is a block diagram showing the electrical configuration of a copier according to an embodiment of the invention.

As shown in FIG. 1, a copier 1 of the present embodiment includes a control section 10, a scanning section 20, a printing section 30, an operating section 40, and a display section 50.

The control section 10 includes a CPU 11 that executes various programs, a ROM 13 that stores the programs to be executed by the CPU 11, a RAM 15 that serves as a working memory, and a NVRAM 17 (flash memory, EEPROM, or the like) that stores various setting information. The CPU 11 of the control section 10 executes the programs stored in the ROM 13, thereby performing overall control of the entire device and realizing functions as the copier 1.

The scanning section 20 is a well-known scanning device that optically scans an original document placed on an original-document placing section (platen glass) and generates scanned image data indicative of scanning results of the original document. The operations of the scanning section 20 are controlled by the control section 10. The scanning section 20 inputs scanned image data to the control section 10.

The printing section 30 is also controlled by the control section 10. The printing section 30 is a well-known printing device that prints an image based on image data to be printed on paper and that discharges the print medium (paper) onto a paper discharge tray. The printing section 30 includes a plurality of paper feed trays. The user can store paper of different sizes in these paper feed trays.

That is, the printing section 30 is configured to feed paper of different sizes by switching the paper feed trays. The printing section 30 is configured to take paper of the size specified by the control section 10 from the paper feed tray, and to print an image based on image data to be printed on this paper.

The operating section 40 includes various operation keys that can be operated by the user. User's operation information inputted through the operation keys is inputted to the control section 10. The control section 10 executes processes associated with the user's operation, based on the operation information inputted from the operating section 40.

The display section 50 includes a color liquid crystal display capable of displaying multiple colors. The control section 10 controls the display section 50 to display various information for the user.

Figure 2:
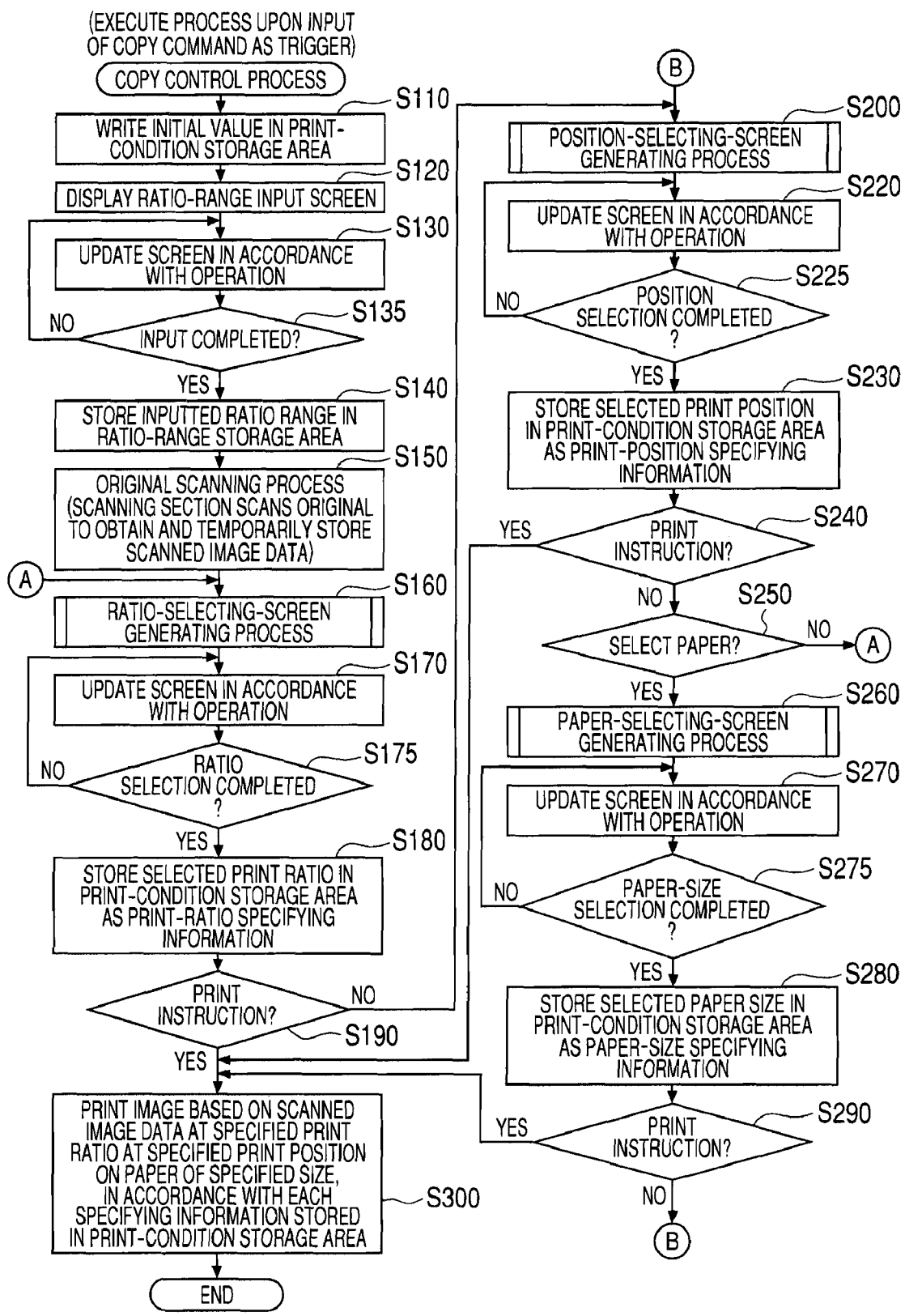
FIG. 2 is a flowchart showing a copy control process executed by a control section.

In the copier 1 of the present embodiment, upon inputting of a copy command through the operating section 40, the control section 10 executes a copy control process shown in FIG. 2. In the copy control process, the control section 10 controls the display section 50 to display a print-ratio selecting screen shown in FIG. 5, a print-position selecting screen shown in FIGS. 7A and 7B, and a paper-size selecting screen shown in FIG. 9. The control section 10 then acquires specifying information on a print ratio, a print position, and a paper size through the operating section 40 from the user. The control section 10 then controls the printing section 30 to print an image based on scanned image data which are the scanned results of the original document, at the print ratio specified by the user, at the print position specified by the user, on paper of the size specified by the user.

Next, the copy control process executed by the CPU 11 of the control section 10 will be described in detail, with reference to FIG. 2.

Upon starting of the copy control process, the control section 10 first writes an initial value of the print ratio, an initial value of the print position, and an initial value of the paper size in a print-condition storage area 152 of the RAM 15, in accordance with print-condition initial-value information 171 stored in the NVRAM 17 (S110).

Here, the print-condition storage area 152 of the RAM 15 is a storage area that stores print-ratio specifying information 153 indicative of the print ratio specified by the user, print-position specifying information 154 indicative of the print position specified by the user, and paper-size specifying information 155 indicative of the paper size specified by the user, as the print conditions specified by the user.

The print-condition initial-value information 171 stored in the NVRAM 17 indicates each initial value of the print ratio, print position, and paper size. In S110, each specifying information in the print-condition storage area 152 is initialized by writing the above-described initial values.

Upon ending the process in S110, the control section 10 controls the display section 50 to display a ratio-range input screen shown in FIG. 3 (S120), and acquires operation information in the ratio-range input screen through the operating section 40. By this, the control section 10 acquires information on the range of print ratios that can be selected in the print-ratio selecting screen shown in FIG. 5, from the user who operates the operating section 40.

After displaying the ratio-range input screen on the display section 50 in S120, the control section 10 updates the ratio-range input screen in accordance with operation information on the ratio-range input screen inputted through the operating section 40 (S130), until the user completes an input operation for the ratio range on the ratio-range input screen.

If a "SELECT PRINT RATIO" button in the ratio-range input screen shown in FIG. 3 is pressed, the control section 10 determines that the input operation for the ratio range is completed (S135: Yes). Thus, the control section 10 ends displaying of the ratio-range input screen, and also writes information on the ratio range, inputted through the ratio-range input screen, to a ratio-range storage area 151 of the RAM 15 as ratio-range specifying information (S140).

Upon ending this process, the control section 10 controls the scanning section 20 to scan an original document placed on the original-document placing section. The control section 10 then obtains, from the scanning section 20, scanned image data indicative of the scanning results of the original document, and temporarily stores the obtained scanned image data in the RAM 15 (S150).

Upon ending the process in S150, the control section 10 proceeds to S160 and executes a ratio-selecting-screen generating process shown in FIG. 4.

Upon starting of the ratio-selecting-screen generating process, the control section 10 reads out the print-position specifying information 154 and the paper-size specifying information 155 from the print-condition storage area 152 of the RAM 15, and sets the print position indicated by the print-position specifying information 154 and the paper size indicated by the paper-size specifying information 155 as the conditions for generating preview images (S161).

Further, the control section 10 reads out the ratio-range specifying information from the ratio-range storage area 151 of the RAM 15. The control section 10 selects N-print ratios as the print ratios used for generating preview image data based on the ratio-range specifying information, the N-print ratios being within the range of print ratios indicated by the ratio-range specifying information (S162). In the present embodiment, N=6.

In S162, assuming that the range of print ratios indicated by the ratio-range specifying information is a range from Rd to Ru, the control section 10 calculates an interval $\Delta$ by an equation $\Delta=|Ru-Rd|/(N-1)$. Assuming that N-print ratios are R1, . . . , RN, the control section 10 selects print ratios $Rn=Rd+(n-1)\cdot\Delta$ (n=1, . . . , N).

For example, if the range of print ratios indicated by the ratio-range specifying information is a range from Rd=80% to Ru=180%, and N=6, then the control section 10 calculates $\Delta$=20% and selects 80%, 100%, 120%, 140%, 160%, and 180% as print ratios R1, R2, R3, R4, R5, and R6, respectively.

After this process, the control section 10 sets a variable n=1 (S163), and then proceeds to S164. In S164, the control section 10 generates preview image data showing the print output results to be obtained when an image based on the scanned image data is printed at print ratio Rn at "print position set as the conditions for generating preview images" on paper of "paper size set as the conditions for generating preview images". In other words, the control section 10 generates preview image data showing the print output results to be obtained when an image based on the scanned image data is printed at print ratio Rn at the print position indicated by the print-position specifying information 154 on paper indicated by the paper-size specifying information 155.

Upon ending the process in S164, the control section 10 proceeds to S165 and increments the variable n by 1, and then proceeds to S166. In S166, the control section 10 determines whether the variable n exceeds a value N (N=6 in the present embodiment). That is, the control section 10 determines whether an inequality n>N is satisfied.

If the control section 10 determines that the variable n exceeds the value N (S166: Yes), then the control section 10 proceeds to S167. If the control section 10 determines that the variable n is less than or equal to the value N (S166: No), then the control section 10 returns to S164, and executes the processes in S164-S166 by using an updated value of the variable n.

In this way, the control section 10 generates preview image data indicating the print output results to be obtained when an image based on scanned image data is printed on paper at each of print ratios R1, R2, R3, R4, R5, and R6 (S164-S166).

Note that preview images are images in which reduced versions of an image indicated by scanned image data are contained within a frame image showing the outer periphery (outline) of paper.

When the print ratio is 100%, an image based on the scanned image data is printed on paper with a normal size without enlargement or reduction. When the print ratio is R %, an image based on the scanned image data is printed on paper in R % ratio of a normal size with enlargement or reduction.

Accordingly, if the size of the above-mentioned frame image showing the outer periphery of paper is A % of actual paper, in S164 the control section 10 generates "an image obtained by reducing an image indicated by scanned image data to (A/100)*Rn % of a normal size, and by superimposing the reduced image onto the frame image in consideration of print position" as preview image data. Note that, in S164, the control section 10 generates the preview image data by cutting a portion (an image region) that goes beyond the frame image, at the above-mentioned superimposing.

If the control section 10 finishes generating preview image data corresponding to print ratios R1, . . . , RN (S166: Yes), the control section 10 proceeds to S167. The control section 10 generates the print-ratio selecting screen of FIG. 5, in which preview images showing the print output results at each print ratio R1, . . . , RN are arranged based on preview image data for each print ratio, and in which a print ratio can be selected through selecting operation of the preview image (S167). Then, the control section 10 displays the print-ratio selecting screen on the display section 50 (S168), thereby allowing the user to perform selecting operation of a print ratio on the print-ratio selecting screen.

Figure 5:
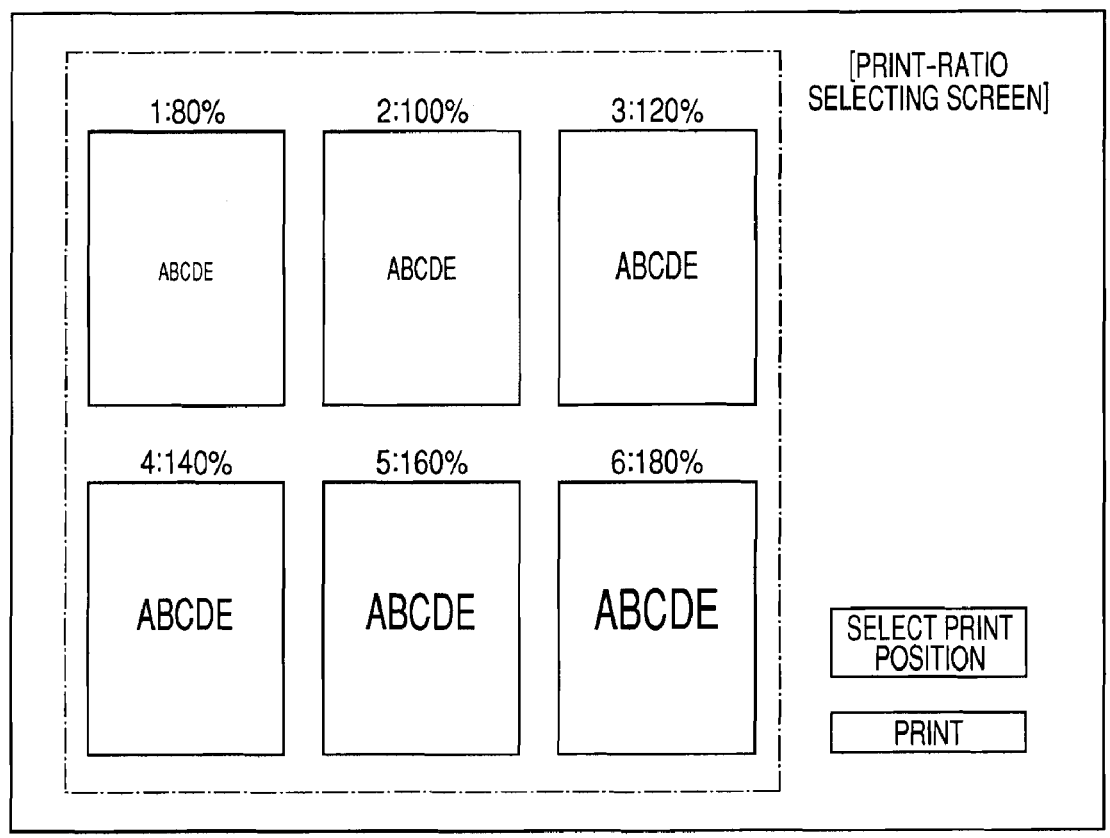
FIG. 5 is an explanatory diagram showing a print-ratio selecting screen.
Figure 6:
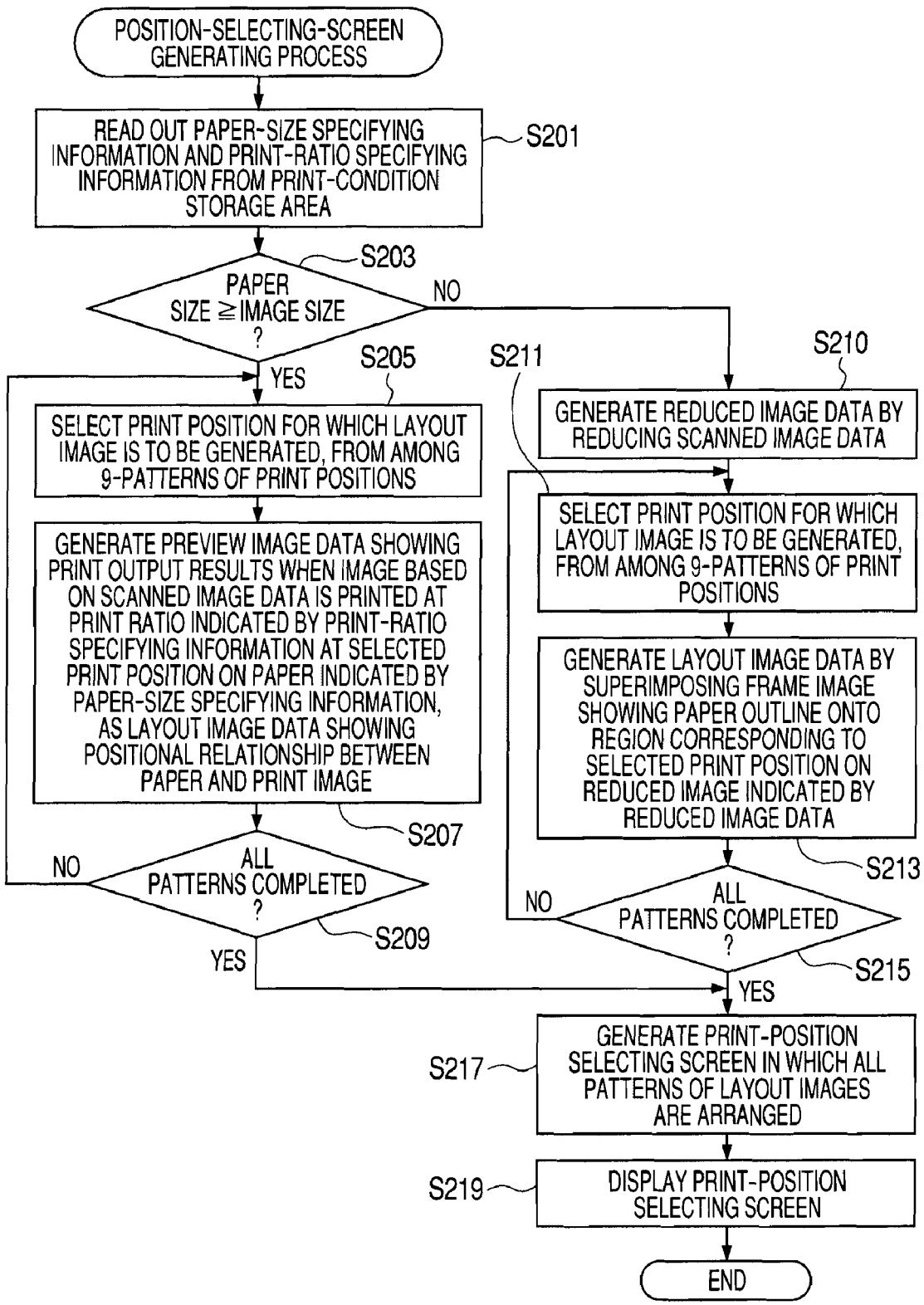
FIG. 6 is a flowchart showing a position-selecting-screen generating process executed by the control section.

As shown in FIG. 5, the print-ratio selecting screen is a screen in which preview images for each print ratio R1, . . . , R6 are laid out and a "SELECT PRINT POSITION" button and a "PRINT" button are laid out. Specifically, the print-ratio selecting screen of FIG. 5 shows the case in which a range of 80% to 180% is specified as the range of print ratios on the ratio-range input screen.

Upon displaying the print-ratio selecting screen of this configuration on the display section 50, the control section 10 ends the ratio-selecting-screen generating process in S160. The control section 10 proceeds to S170 and updates the print-ratio selecting screen in accordance with operation information on the print-ratio selecting screen inputted through the operating section 40, until the user completes selecting operation of a print ratio. Specifically, the control section 10 performs a process of moving the cursor among the preview images in accordance with user's operation, and the like.

If the "SELECT PRINT POSITION" button or the "PRINT" button is pressed on the print-ratio selecting screen, the control section 10 determines that selecting operation of print ratio is completed (S175: Yes). At this time, the control section 10 ends displaying of the print-ratio selecting screen, and writes, to the print-condition storage area 152 of the RAM 15, the print ratio corresponding to the preview image on which the cursor was located at completion of selecting operation, as information of the print ratio specified by the user. That is, the control section 10 changes the print ratio indicated by the print-ratio specifying information 153 in the print-condition storage area 152 to the print ratio specified by the user (S180).

Upon ending this process, the control section 10 determines whether the "PRINT" button was pressed at completion of selecting operation of the print ratio (S190). If the control section 10 determines that the "PRINT" button was pressed (S190: Yes), the control section 10 proceeds to S300 and controls the printing section 30 to print on paper an image based on scanned image data obtained in S150, in accordance with the print-ratio specifying information 153, the print-position specifying information 154, and the paper-size specifying information 155 stored in the print-condition storage area 152 of the RAM 15.

Specifically, the control section 10 controls the printing section 30 to feed paper of the size indicated by the paper-size specifying information 155 and to print an image based on the scanned image data at the print ratio indicated by the print-ratio specifying information 153, at the print position indicated by the print-position specifying information 154 on the paper.

For example, the control section 10 generates binary image data of image size adapted to paper size indicated by the paper-size specifying information 155, as input data to the printing section 30, the binary image data being binary data of scanned image data processed with enlargement or reduction by the print ratio specified by the print-ratio specifying information 153, the binary image data being arranged at pixel positions within an image corresponding to the print position specified by the print-position specifying information 154. The control section 10 inputs the binary image data to the printing section 30, and instructs the printing section 30 to feed paper of the size indicated by the paper-size specifying information 155, thereby controlling the printing section 30 to execute the above-described printing process.

With this process, the printing section 30 prints a copy of the original document that meets the print conditions specified by the user. Upon ending the process in S300, the control section 10 ends the copy control process.

On the other hand, if the control section 10 determines that the "SELECT PRINT POSITION" button, not the "PRINT" button, was pressed (S190: No) at completion of selection operation of the print ratio, the control section 10 proceeds to S200 and executes a position-selecting-screen generating process shown in FIG. 6.

Upon starting the position-selecting-screen generating process, the control section 10 reads out the print-ratio specifying information 153 and the paper-size specifying information 155 from the print-condition storage area 152 of the RAM 15. The control section 10 then sets the print ratio indicated by the print-ratio specifying information 153 and the paper size indicated by the paper-size specifying information 155 as generating information of a layout image (S201).

After this process, the control section 10 proceeds to S203, and determines whether the paper size set as the generating information of a layout image is larger than or equal to the size of enlarged/reduced image when scanned image data obtained in S150 is enlarged or reduced by the print ratio indicated by the print-ratio specifying information 153.

If the control section 10 determines that the paper size is larger than or equal to the above-mentioned image size (S203: Yes), the control section 10 proceeds to S205 and selects one print position for which the layout image is to be generated, from among nine patterns of print positions.

The copier 1 of the present embodiment is so configured that the user can select a position on paper at which an image smaller than or equal to paper size is to be printed, as the print position. One of the print positions can be selected from among "LEFT UPPER", "CENTER UPPER", "RIGHT UPPER", "LEFT MIDDLE", "CENTER MIDDLE", "RIGHT MIDDLE", "LEFT LOWER", "CENTER LOWER", and "RIGHT LOWER".

For example, if the print position is "LEFT UPPER", the copier 1 prints an image smaller than paper so that the left-upper corner of the image matches the left-upper corner of the paper. If the print position is "CENTER MIDDLE", the copier 1 prints an image smaller than paper so that the vertical and horizontal center of the image matches the vertical and horizontal center of the paper.

In S205, the control section 10 selects one print position for which a layout image is to be generated, from among the nine patterns of "LEFT UPPER", "CENTER UPPER", "RIGHT UPPER", "LEFT MIDDLE", "CENTER MIDDLE", "RIGHT MIDDLE", "LEFT LOWER", "CENTER LOWER", and "RIGHT LOWER".

Upon selecting one print position for which a layout image is to be generated in S205, the control section 10 proceeds to S207. In S207, the control section 10 generates preview image data indicating the print output results to be obtained when an image based on scanned image data is printed at "print ratio set as the generating conditions of a layout image" at the selected print position on paper of "paper size set as the generating conditions of a layout image", as layout image data. In other words, the control section 10 generates preview image data indicating the print output results to be obtained when an image based on scanned image data is printed at the print ratio indicated by the print-ratio specifying information 153 at the selected print position on paper indicated by the paper-size specifying information 155, as layout image data indicating the positional relationship between paper and a print image.

Specifically, in S207 the control section 10 generates layout image data in which reduced versions of an image indicated by scanned image data are contained within a frame image showing the outer periphery of paper, like the process in S164.

Upon ending this process, the control section 10 determines whether layout image data are generated for all the patterns (S209). If the control section 10 determines that layout image data are not generated for all the patterns (S209: No), the control section 10 returns to S205 and selects one print position that is not selected yet, and then executes the process in S207 and thereafter. With this process, the control section 10 generates layout image data which indicates the positional relationship between paper and print images when an image is printed at each print position.

If the control section 10 determines that layout image data are generated for all the patterns (nine patterns in the present embodiment) (S209: Yes), the control section 10 proceeds to S217 and generates the print-position selecting screen shown in FIG. 7A. In the print-position selecting screen of FIG. 7A, layout images are arranged for each print position based on each of layout image data, the layout images being indicative of the positional relationship between paper and print images. The print-position selecting screen is configured to allow the user to select a print position by selection operation of a layout image. The control section 10 controls the display section 50 to display the print-position selecting screen (S219).

Figure 7A:
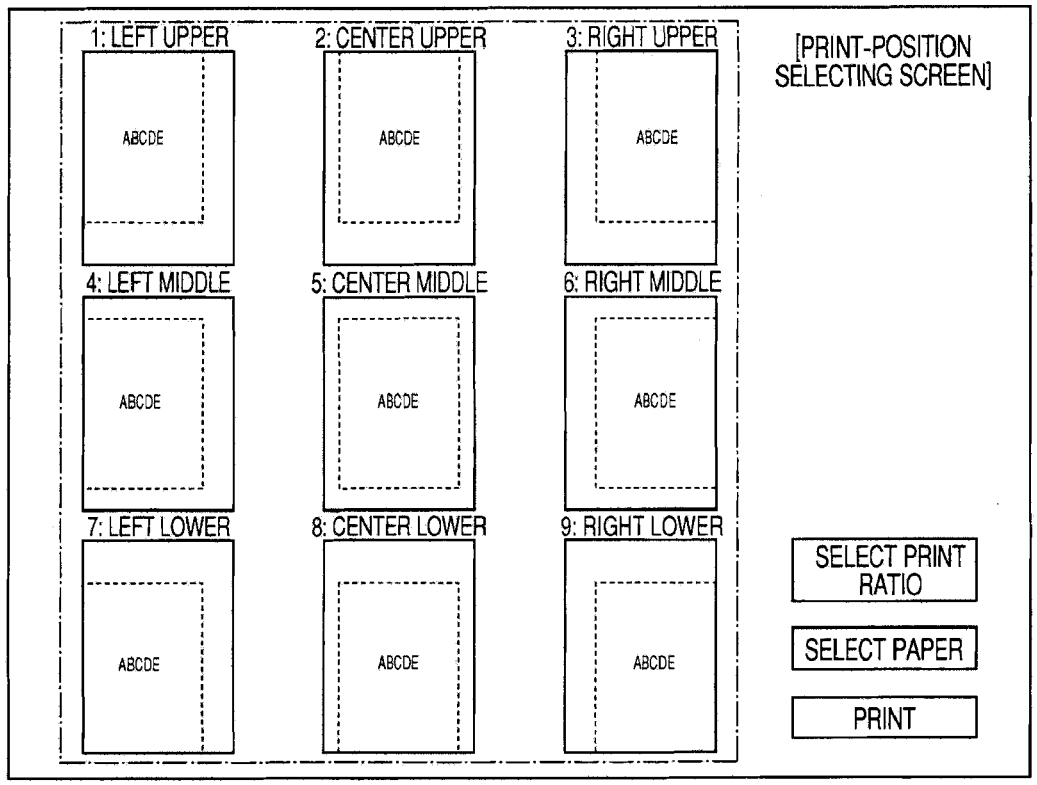
FIG. 7A is an explanatory diagram showing a print-position selecting screen, wherein a paper size (solid lines) is larger than a print image (dotted lines)
Figure 7B:
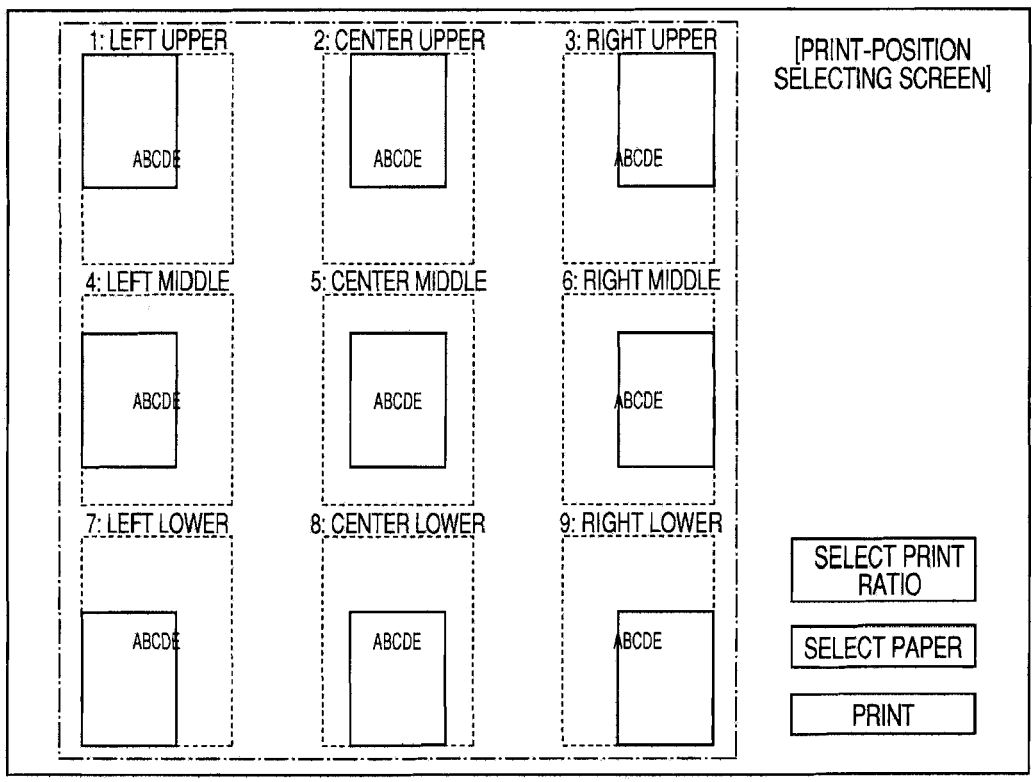
FIG. 7B is an explanatory diagram showing another print-position selecting screen, wherein a print image (dotted lines) is larger than a paper size (solid lines)
Figure 8:
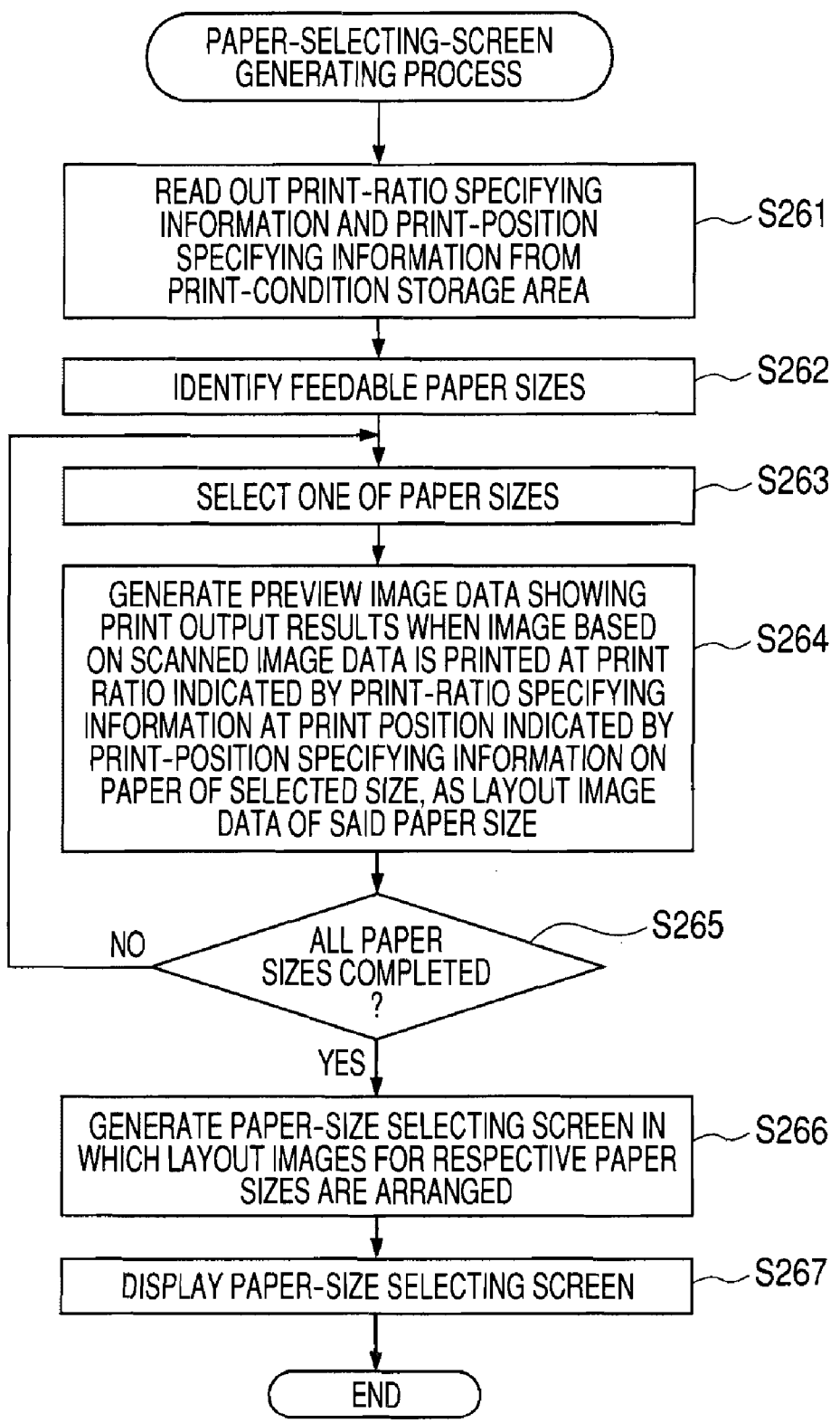
FIG. 8 is a flowchart showing a paper-selecting-screen generating process executed by the control section.

As shown in FIG. 7A, the print-position selecting screen displays a "SELECT PRINT RATIO" button, a "SELECT PAPER" button, and a "PRINT" button, in addition to layout images. Note that, in the print-position selecting screen of FIG. 7A, the dotted lines in the layout images indicate the outer peripheries of print images, and the solid lines indicate the outer peripheries of paper. In the present embodiment, the copier 1 allows the user to perform selecting operation of a print position through the print-position selecting screen.

On the other hand, if the control section 10 determines that the paper size is smaller than the above-mentioned image size in S203 (S203: No), the control section 10 proceeds to S210 and generates reduced image data by reducing scanned image data into a predetermined image size.

After this process, the control section 10 proceeds to S211 and selects one print position for which a layout image is to be generated, from among nine patterns of print positions. Specifically, in S211 the control section 10 selects one print position for which a layout image is to be generated, from among nine patterns of "LEFT UPPER", "CENTER UPPER", "RIGHT UPPER", "LEFT MIDDLE", "CENTER MIDDLE", "RIGHT MIDDLE", "LEFT LOWER", "CENTER LOWER", and "RIGHT LOWER", like the process in S205.

Upon ending the process in S211, the control section 10 proceeds to S213 and generates layout image data by superimposing a frame image showing the outer periphery of paper onto a region corresponding to selected print position on a reduced image indicated by reduced image data.

The copier 1 of the present embodiment is configured to print an image on paper if the image size is larger than the paper size, as follows. For example, if the print position is "LEFT UPPER", the copier 1 prints an image on paper so that the left-upper corner of the image matches the left-upper corner of the paper. If the print position is "CENTER MIDDLE", the copier 1 prints an image on paper so that the vertical and horizontal center of the image matches the vertical and horizontal center of the paper.

Hence, in S213, the control section 10 generates layout image data by superimposing a frame image showing the outer periphery of paper onto a reduced image indicated by reduced image data, in accordance with the above-described rules.

In other words, in S213, the control section 10 generates preview image data showing the print output results to be obtained when an image based on scanned image data is printed at "print ratio set as the generating conditions of a layout image" at the selected print position on paper of "paper size set as the generating conditions of a layout image", as layout image data. Here, the control section 10 generates preview image data for a preview image including an image region that goes beyond the outer periphery of paper, without cutting the image region.

Upon generating layout image data of this configuration in S213, the control section 10 proceeds to S215 and determines whether layout image data are generated for all the patterns.

If the control section 10 determines that layout image data are not generated for all the patterns (S215: No), the control section 10 returns to S211 and selects one print position that is not selected yet, and then executes the process in S213 and thereafter. In this way, layout image data for each print position are generated.

If the control section 10 determines that layout image data are generated for all the patterns (S215: Yes), the control section 10 proceeds to S217 and generates the print-position selecting screen of FIG. 7B in which layout images are arranged based on layout image data for each print position. The control section 10 controls the display section 50 to display the print-position selecting screen (S219).

In the present embodiment, the copier 1 allows the user to perform selecting operation of a print position through the print-position selecting screen. Like the FIG. 7A, in the print-position selecting screen of FIG. 7B, the dotted lines in the layout images indicate the outer peripheries of print images, and the solid lines indicate the outer peripheries of paper.

Upon displaying the print-position selecting screen on the display section 50 in this way, the control section 10 ends the position-selecting-screen generating process. The control section 10 updates the print-position selecting screen in accordance with operation information on the print-position selecting screen inputted through the operating section 40 (S220), until the user completes selecting operation of a print position. Specifically, the control section 10 performs a process of moving the cursor among the layout images in accordance with user's operation, and the like.

If the "SELECT PRINT RATIO" button, the "SELECT PAPER" button, or the "PRINT" button is pressed on the print-position selecting screen, the control section 10 determines that selecting operation of print position is completed (S225: Yes). At this time, the control section 10 ends displaying of the print-position selecting screen, and writes, to the print-condition storage area 152 of the RAM 15, the print position corresponding to the layout image on which the cursor was located at completion of selecting operation, as information of the print position specified by the user. That is, the control section 10 changes the print position indicated by the print-position specifying information 154 in the print-condition storage area 152 to the print position specified by the user (S230).

Upon ending this process, the control section 10 determines whether the "PRINT" button was pressed at completion of selecting operation of the print position (S240). If the control section 10 determines that the "PRINT" button was pressed (S240: Yes), the control section 10 proceeds to S300 and controls the printing section 30 to print on paper an image based on scanned image data obtained in S150, in accordance with the print-ratio specifying information 153, the print-position specifying information 154, and the paper-size specifying information 155 stored in the print-condition storage area 152 of the RAM 15.

On the other hand, if the control section 10 determines that the "PRINT" button was not pressed (S240: No), the control section 10 determines whether the "SELECT PAPER" button was pressed at completion of selection operation of the print position (S250).

If the control section 10 determines that not the "SELECT PAPER" button but the "SELECT PRINT RATIO" button was pressed (S250: No), the control section 10 returns to S160 and again executes the ratio-selecting-screen generating process shown in FIG. 4.

If the control section 10 determines that the "SELECT PAPER" button was pressed (S250: Yes), the control section 10 proceeds to S260 and executes a paper-selecting-screen generating process shown in FIG. 8.

Upon starting the paper-selecting-screen generating process, the control section 10 reads out the print-ratio specifying information 153 and the print-position specifying information 154 from the print-condition storage area 152 of the RAM 15, and sets the print ratio indicated by the print-ratio specifying information 153 and the print position indicated by the print-position specifying information 154 as the generating condition of a layout image (S261). The control section 10 then reads out feedable paper-size information 172 stored in the NVRAM 17, and identifies paper sizes that can be fed by the printing section 30 (S262).

Note that the feedable paper-size information 172 stored in the NVRAM 17 is information indicative of the size of paper stacked in each paper feed tray. The paper size of each paper feed tray is inputted through the operating section 40 by the user. That is, the copier 1 has a function of updating the feedable paper-size information 172 in accordance with operation information inputted through the operating section 40.

Upon ending the process in S262, the control section 10 proceeds to S263 and selects one paper size for which a layout image is to be generated, from among feedable paper sizes identified in S262.

Upon selecting one paper size for which a layout image is to be generated, the control section 10 proceeds to S264. In S264, the control section 10 generates preview image data indicating the print output results to be obtained when an image based on scanned image data is printed at "print ratio set as the generating conditions of a layout image" at "print position set as the generating conditions of a layout image" on paper of the selected paper size, as layout image data. In other words, the control section 10 generates preview image data indicating the print output results to be obtained when an image based on scanned image data is printed at the print ratio indicated by the print-ratio specifying information 153 at the print position indicated by the print-position specifying information 154 on paper of the selected size, as layout image data of said paper size.

At this time, the control section 10 generates image data indicating a layout image which is formed by superimposing a frame image showing the outer periphery of paper onto a reduced image of an image indicated by scanned image data, as the layout image data. Here, the control section 10 generates layout image data without cutting an image region that goes beyond the outer periphery of paper, like the process in S213.

Upon generating layout image data in this way in S264, the control section 10 proceeds to S265 and determines whether layout image data are generated for all of the feedable paper sizes.

If the control section 10 determines that layout image data are not generated for all of the feedable paper sizes (S265: No), the control section 10 returns to S263 and selects one of paper sizes that is not selected yet. The control section 10 then executes the processes in S264 and thereafter. In this way, the control section 10 generates layout image data adapted to each paper size.

Figure 9:
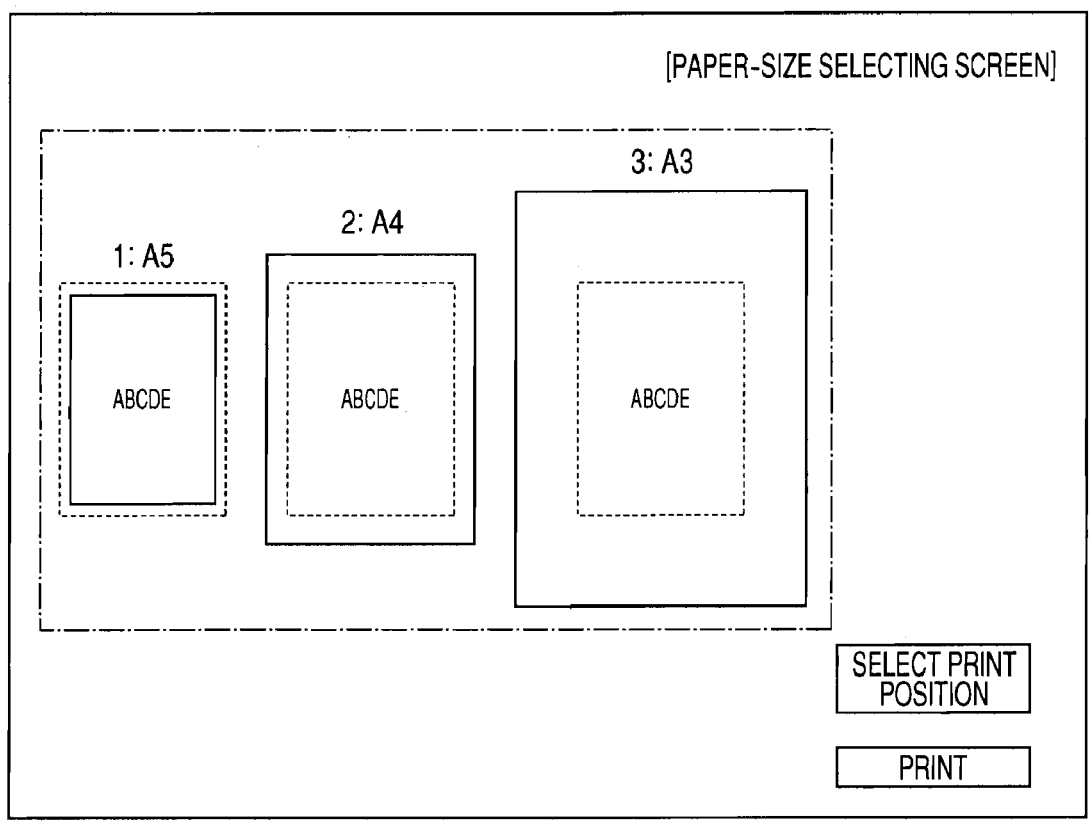
FIG. 9 is an explanatory diagram showing a paper-size selecting screen.

If the control section 10 determines that layout image data are generated for all of the feedable paper sizes (S265: Yes), the control section 10 generates a paper-size selecting screen in which layout images indicated by layout image data for the respective paper sizes are arranged (S266). The paper-size selecting screen of FIG. 9 is configured to allow the user to select a paper size by selection operation of a layout image. The control section 10 then controls the display section 50 to display the paper-size selecting screen (S267).

In the paper-size selecting screen shown in FIG. 9, a "SELECT PRINT POSITION" button and a "PRINT" button are displayed, as well as layout images. Note that, in the paper-size selecting screen of FIG. 9, the dotted lines in the layout images indicate the outer peripheries of print images, and the solid lines indicate the outer peripheries of paper.

In the present embodiment, the copier 1 allows the user to perform selecting operation of a paper size through the paper-size selecting screen.

Upon displaying the paper-size selecting screen on the display section 50, the control section 10 ends the paper-selecting-screen generating process. The control section 10 updates the paper-size selecting screen in accordance with operation information on the paper-size selecting screen inputted through the operating section 40 (S270), until the user completes selecting operation of a paper size. Specifically, the control section 10 performs a process of moving the cursor among the layout images in accordance with user's operation, and the like.

If the "SELECT PRINT POSITION" button or the "PRINT" button is pressed on the paper-size selecting screen shown in FIG. 9, the control section 10 determines that selecting operation of paper size is completed (S275: Yes). At this time, the control section 10 ends displaying of the paper-size selecting screen, and writes, to the print-condition storage area 152 of the RAM 15, the paper size corresponding to the layout image on which the cursor was located at completion of selecting operation, as information of the paper size specified by the user. That is, the control section 10 changes the paper size indicated by the paper-size specifying information 155 in the print-condition storage area 152 to the paper size specified by the user (S280).

Upon ending this process, the control section 10 determines whether the "PRINT" button was pressed at completion of selecting operation of the paper size (S290). If the control section 10 determines that the "PRINT" button was pressed (S290: Yes), the control section 10 proceeds to S300 and controls the printing section 30 to print on paper an image based on scanned image data obtained in S150, in accordance with the print-ratio specifying information 153, the print-position specifying information 154, and the paper-size specifying information 155 stored in the print-condition storage area 152 of the RAM 15.

On the other hand, if the control section 10 determines that not the "PRINT" button but the "SELECT PRINT POSITION" button was pressed (S290: No), the control section 10 returns to S200 and again executes the position-selecting-screen generating process shown in FIG. 6.

The configuration of the copier 1 according to the present embodiment is described above. According to the present embodiment, upon inputting a copy command through the operating section 40, the copier 1 displays preview images showing the print output results to be obtained when a copy image of an original document is printed at each of a plurality of print ratios in the ratio range specified by the user. After displaying the preview images, the copier 1 prints an image based on scanned image data on paper at the print ratio specified by the user.

Accordingly, when the user makes a copy of an original document on the copier 1, he/she can understand the relationship between print ratios and the print output results from preview images. Thus, the user can readily understand which print ratio is to be selected for printing on the copier 1 in order to obtain the desired print output results, and thus can specify an appropriate print ratio on the copier 1.

Especially, according to the present embodiment, preview images for respective print ratios are displayed in a table format on the print-ratio selecting screen on the display section 50. Hence, the user can readily understand which print ratio is the most appropriate, and can specify the most appropriate print ratio on the copier 1.

Further, the copier 1 of the present embodiment is configured to be also capable of specifying a print position, and to display layout images for respective print positions on the display section 50, the layout images showing the positional relationship between paper and print images in a table format. Thus, based on the layout images, the user can readily understand which print position is to be selected for printing on the copier 1 in order to obtain the desired print output results, and thus can specify the most appropriate print position on the copier 1.

In addition, the copier 1 of the present embodiment is configured to be also capable of specifying a paper size, and to display layout images for respective paper sizes on the display section 50, the layout images showing the positional relationship between paper and print images when an image based on scanned image data is printed on paper of respective sizes. Thus, based on the layout images, the user can readily understand which size of paper is to be selected for printing in order to obtain the desired print output results, and thus can specify the most appropriate paper size on the copier 1.

Further, according to the copier 1 of the present embodiment, even if the user is likely to hesitate to set the print ratio to a small value to an extent that the entire print image is contained in paper because the character size becomes too small etc., the entire print image can be contained in paper by switching the paper size.

Further, if the user wish to enlarge only a part of an image indicated by image data and to print the part on paper, he/she can adjust the print ratio (enlargement ratio) to an appropriate value and then adjust the paper size, thereby printing the part of the image in an appropriate size on paper of an appropriate size.

Consequently, the copier 1 of the present embodiment can avoid repeating of copy operations by the user, due to the reason that the desired print output results cannot be obtained. Hence, a waste of electric power and resources such as paper can be suppressed.

Modifications

While the invention has been described in detail with reference to the above aspects thereof, it would be apparent to those skilled in the art that various changes and modifications may be made therein without departing from the scope of the claims.

For example, in the above-described embodiment, the display section 50 displays each of a set of preview images for respective print ratios, a set of layout images for respective print positions, and a set of layout images for respective paper sizes in a table format (in a single screen). However, in order to display the above-mentioned set of preview/layout images in a table format (in a single screen) on the display section 50, the copier 1 needs to be equipped with a liquid crystal display etc. having a large display area, which increases the product price.

Hence, in the case of a liquid crystal display having a small display area, it may be so configured that a reduced number of preview/layout images is displayed in a single screen, and that preview/layout images on a display can be sequentially changed by a next-page button or the like.

Alternatively, instead of displaying preview/layout images on a display, a copier may be configured to print on paper each set of preview/layout images surrounded by the single-dot chain lines in FIG. 5, FIGS. 7A and 7B, and FIG. 9, thereby presenting preview images for respective print ratios, layout images for respective print positions, and layout images for respective paper sizes to the user.

In this case, it is preferable that the copier be configured to print a set of preview images for respective print ratios on a single sheet of paper, print a set of layout images for respective print positions on a single sheet of paper, and print a set of layout images for respective paper sizes on a single sheet of paper, in accordance with the user's need, so as to suppress the amount of paper consumption.

For example, the copier of this configuration can be realized by: replacing the processes in S167 and S168 with a process of controlling the printing section 30 to print, on a single sheet of paper, a table-format image in which preview images for respective print ratios are arranged; replacing the processes in S217 and S219 with a process of controlling the printing section 30 to print, on a single sheet of paper, a table-format image in which layout images for respective print positions are arranged; replacing the processes in S266 and S267 with a process of controlling the printing section 30 to print, on a single sheet of paper, a table-format image in which layout images for respective paper sizes are arranged; and also controlling the display section 50 to display a screen obtained by simplifying each selecting screen shown in FIG. 5, FIGS. 7A and 7B, and FIG. 9 so as to be adapted to print outputs of the above-mentioned table-format images (for example, a screen in which preview/layout images are omitted).

Further, a copier may be configured to be capable of enlarging preview images and layout images (displaying by the same size as the size at printing, or the like) in each selecting screen of the print-ratio selecting screen, the print-position selecting screen, and the paper-size selecting screen in accordance with the user's instruction. According to the copier of this configuration, the user can check in detail whether lines of print images are not too thin, whether characters are not too small, and the like.

Further, a copier may be so configured that the user can specify a print region within an image indicated by scanned image data on the print-ratio selecting screen, the print-position selecting screen, and the like, the print region being a region to be printed on paper.

In the above-described embodiment, a preview image indicates the print results (print output results) to be obtained when an image based on scanned image data is printed on paper at a specified print ratio. However, a preview image may include any indicator of the print results. The above-described reduced versions of the actual print image are one example of such an indicator. Another example of the indicator is an image showing the size of representative characters which appear on paper when an image is printed on paper at the specified print ratio.

What is claimed is:

1. A print control device comprising:
a data acquiring section that acquires image data;
a print control section that controls a printing device to print an image based on the image data on a sheet;
a preview-image output control section that outputs preview images at a plurality of print ratios, the preview images being indicators of print results to be obtained when the printing device prints, on the sheet, the image based on the image data at the respective print ratios; and
a print-ratio acquiring section that acquires print-ratio specifying information through an input device that can be operated by a user, after the preview-image output control section outputs the preview images;
a first layout-image output control section that, after the print-ratio acquiring section acquires the print-ratio specifying information, outputs a print-position selecting screen in which print-position layout images are arranged, the print-position layout images each showing positional relationship between a sheet and a print image when the printing device prints, on the sheet, the image based on the image data at a print ratio specified by the print-ratio specifying information at respective ones of a plurality of print positions, the print position selecting screen configured to receive selection of one of the plurality of print positions by receiving selecting operation of the print-position layout images through the input device; and
a print-position acquiring section that acquires print-position specifying information through the input device after the first layout-image output control section outputs the print-position layout images, the print-position specifying information being information for specifying a print position on a sheet and corresponding to a print-position layout image selected through the print-position selecting screen,
wherein the print control section controls the printing device to print, on the sheet, the image based on the image data at the print ratio specified by the print-ratio specifying information at the print position specified by the print-position specifying information.

2. The print control device according to claim 1, wherein the preview-image output control section comprises a preview-image display control section that controls a display device to display the preview images.

3. The print control device according to claim 2, wherein the preview-image display control section controls the display device to display a print-ratio selecting screen in which the preview images at the respective print ratios are arranged, the print-ratio selecting screen allowing a user to select one of the plurality of print ratios by selecting operation of the preview images through the input device; and wherein the print-ratio acquiring section acquires, as the print-ratio specifying information, information of the print ratio corresponding to a preview image selected through the print-ratio selecting screen.

4. The print control device according to claim 2, wherein the preview-image display control section controls the display device to display the preview images based on the image data indicating print results to be obtained when the printing device prints, on the sheet, the image based on the image data at the respective print ratios.

5. The print control device according to claim 1, wherein the first layout-image output control section outputs the print-position layout images based on the image data indicating print results to be obtained when the printing device prints, on the sheet, the image based on the image data at the print ratio specified by the print-ratio specifying information at the respective print positions.

6. The print control device according to claim 1, further comprising a sheet-size switching section that switches a size of the sheet on which the printing device prints the image based on the image data, in accordance with operation information inputted through the input device.

7. The print control device according to claim 6, further comprising a second layout-image output control section that, after the print-position acquiring section acquires the print-position specifying information, outputs sheet-size layout images each showing positional relationship between a sheet and a print image when the printing device prints the image based on the image data at the print ratio specified by the print-ratio specifying information at the print position specified by the print-position specifying information on sheets of respective ones of a plurality of sizes, wherein the sheet-size switching section switches the size of the sheet on which the printing device prints the image based on the image data in accordance with operation information inputted through the input device, after the second layout-image output control section outputs the sheet-size layout images.

8. The print control device according to claim 2, further comprising a range acquiring section that acquires a ratio-range specifying information through the input device, the ratio-range specifying information being information specifying a range of print ratios set for the preview images, wherein the preview-image display control section determines a plurality of print ratios within the range of print ratios specified by the ratio-range specifying information in accordance with a predetermined rule, and controls the display device to display the preview images at the respective print ratios.

9. The print control device according to claim 2, wherein the data acquiring section controls a scanning device in accordance with a scanning command inputted through the input device, and controls the scanning device to optically scan an original document, thereby acquiring the image data indicative of scanning results of the original document from the scanning device.

10. The print control device according to claim 2, wherein the preview-image display control section controls the display device so that the preview images can be sequentially changed in accordance with operations by a user.

11. The print control device according to claim 1, wherein the preview-image output control section comprises a preview-image print control section that controls the printing device to print, on a sheet, an image including the preview images at the respective print ratios.

12. A print control device comprising:

a data acquiring section that acquires image data;

a print control section that controls a printing device to print an image based on the image data on a sheet;

a preview-image output control section that outputs preview images at a plurality of print ratios, the preview images being indicators of print results to be obtained when the printing device prints, on the sheet, the image based on the image data at the respective print ratios;

a print-ratio acquiring section that acquires print-ratio specifying information through an input device configured to receive a user instruction, after the preview-image output control section outputs the preview images;

a first layout-image output control section that, after the print-ratio acquiring section acquires the print-ratio specifying information, outputs print-position layout images each showing positional relationship between a sheet and a print image when the printing device prints, on the sheet, the image based on the image data at a print ratio specified by the print-ratio specifying information at respective ones of a plurality of print positions, the print-position layout images being based on the image data indicating print results to be obtained when the printing device prints, on the sheet, the image based on the image data at the print ratio specified by the print-ratio specifying information at the respective print positions; and a print-position acquiring section that acquires print-position specifying information through the input device after the first layout-image output control section outputs the print-position layout images, the print-position specifying information being information for specifying a print position on a sheet, wherein the print control section controls the printing device to print, on the sheet, the image based on the image data at the print ratio specified by the print-ratio specifying information at the print position specified by the print-position specifying information.

13. A print control device comprising:

a data acquiring section that acquires image data;

a print control section that controls a printing device to print an image based on the image data on a sheet;

a preview-image output control section that outputs preview images at a plurality of print ratios, the preview images being indicators of print results to be obtained when the printing device prints, on the sheet, the image based on the image data at the respective print ratios;

a print-ratio acquiring section that acquires print-ratio specifying information through an input device configured to receive a user instruction, after the preview-image output control section outputs the preview images;

a first layout-image output control section that, after the print-ratio acquiring section acquires the print-ratio specifying information, outputs print-position layout images each showing positional relationship between a sheet and a print image when the printing device prints, on the sheet, the image based on the image data at a print ratio specified by the print-ratio specifying information at respective ones of a plurality of print positions;

a print-position acquiring section that acquires print-position specifying information through the input device after the first layout-image output control section outputs the print-position layout images, the print-position specifying information being information for specifying a print position on a sheet, a second layout-image output control section that, after the print-position acquiring section acquires the print-position specifying information, outputs sheet-size layout images each showing positional relationship between a sheet and a print image when the printing device prints the image based on the image data at the print ratio specified by the print-ratio specifying information at the print position specified by the print-position specifying information on sheets of respective ones of a plurality of sizes; and a sheet-size switching section that switches a size of the sheet on which the printing device prints the image based on the image data in accordance with operation information inputted through the input device, after the second layout-image output control section outputs the sheet-size layout images, wherein the print control section controls the printing device to print, on the sheet, the image based on the image data at the print ratio specified by the print-ratio specifying information at the print position specified by the print-position specifying information on the sheet selected by the sheet-size switching section.

* * * * *